US008073436B2

(12) United States Patent
Yaqub et al.

(10) Patent No.: US 8,073,436 B2
(45) Date of Patent: Dec. 6, 2011

(54) APPLICATIONS AND/OR SITUATION RESPONSIVE UTILIZATION OF SILENT PERIODS

(75) Inventors: Raziq Yaqub, Stewartsville, NJ (US); Tao Zhang, Fort Lee, NJ (US)

(73) Assignees: Toshiba America Research, Inc., Washington, DC (US); Telcordia Technologies, Inc., Piscataway, NJ (US)

( * ) Notice: Subject to any disclaimer, the term of this patent is extended or adjusted under 35 U.S.C. 154(b) by 1011 days.

(21) Appl. No.: 11/558,273

(22) Filed: Nov. 9, 2006

(65) Prior Publication Data

US 2007/0178876 A1 Aug. 2, 2007

Related U.S. Application Data

(60) Provisional application No. 60/763,520, filed on Jan. 31, 2006.

(51) Int. Cl.
*H04M 3/00* (2006.01)
(52) U.S. Cl. ............ 455/418; 370/311; 455/343.25; 455/455.2; 455/515; 455/574; 455/555; 455/571; 455/572; 455/573; 455/127.1
(58) Field of Classification Search ............ 370/311; 455/343.2, 435.2, 515, 435.1, 555, 522, 571–574, 455/127.1–127.5, 456.1–457, 441
See application file for complete search history.

(56) References Cited

U.S. PATENT DOCUMENTS

| 5,640,677 | A  | * | 6/1997  | Karlsson ............... 455/434 |
| 6,044,090 | A  | * | 3/2000  | Grau et al. ............ 370/485 |
| 6,947,399 | B1 | * | 9/2005  | Sen et al. .............. 370/331 |
| 7,068,623 | B1 | * | 6/2006  | Barany et al. .......... 370/329 |
| 7,299,046 | B1 | * | 11/2007 | Ozugur et al. ......... 455/439 |
| 2003/0081657 | A1 | * | 5/2003  | Ranta .................... 375/147 |
| 2003/0193910 | A1 | * | 10/2003 | Shoaib et al. ......... 370/331 |
| 2005/0232200 | A1 | * | 10/2005 | Jeong et al. ........... 370/331 |
| 2005/0245292 | A1 | * | 11/2005 | Bennett et al. ........ 455/574 |
| 2006/0160537 | A1 | * | 7/2006  | Buckley et al. ...... 455/435.2 |
| 2007/0082716 | A1 | * | 4/2007  | Behzad et al. ......... 455/574 |
| 2008/0298391 | A1 | * | 12/2008 | Feroz et al. ............ 370/468 |

OTHER PUBLICATIONS

U.S. Appl. No. 11/096,721, filed Apr. 11, 2005, T. Zhang.
U.S. Appl. No. 11/161,668, filed Aug. 11, 2005, T. Zhang.
U.S. Appl. No. 11/161,298, filed Jul. 28, 2005, R. Yaqub.
U.S. Appl. No. 12/531,814, filed Jan. 31, 2006, R. Yaqub.
U.S. Appl. No. 11/267,590, filed Nov. 7, 2005, K. Taniuchi.
U.S. Appl. No. 11/464,188, filed Aug. 11, 2006, R. Yaqub.
R. Wakikawa, I.E.T.F. "Multiple Care-of Address Registration", Internet Draft, Oct. 2006, p. 1-36, Monami6 Working Group, USA.

* cited by examiner

*Primary Examiner* — Kamran Afshar
*Assistant Examiner* — Edward Zhang
(74) *Attorney, Agent, or Firm* — Westerman, Hattori, Daniels & Adrian, LLP

(57) ABSTRACT

A mobile apparatus is disclosed that includes: a plurality of network interfaces; a processor; the mobile being configured to monitor applications running on it, including real time or non real time nature of said applications; the mobile being configured to monitor its operating situation, including moving or non moving status; and the mobile being configured to control processes of the mobile during silent periods based on one or more of its application awareness and its operating situation awareness.

19 Claims, 9 Drawing Sheets

Automatic Mode Selector

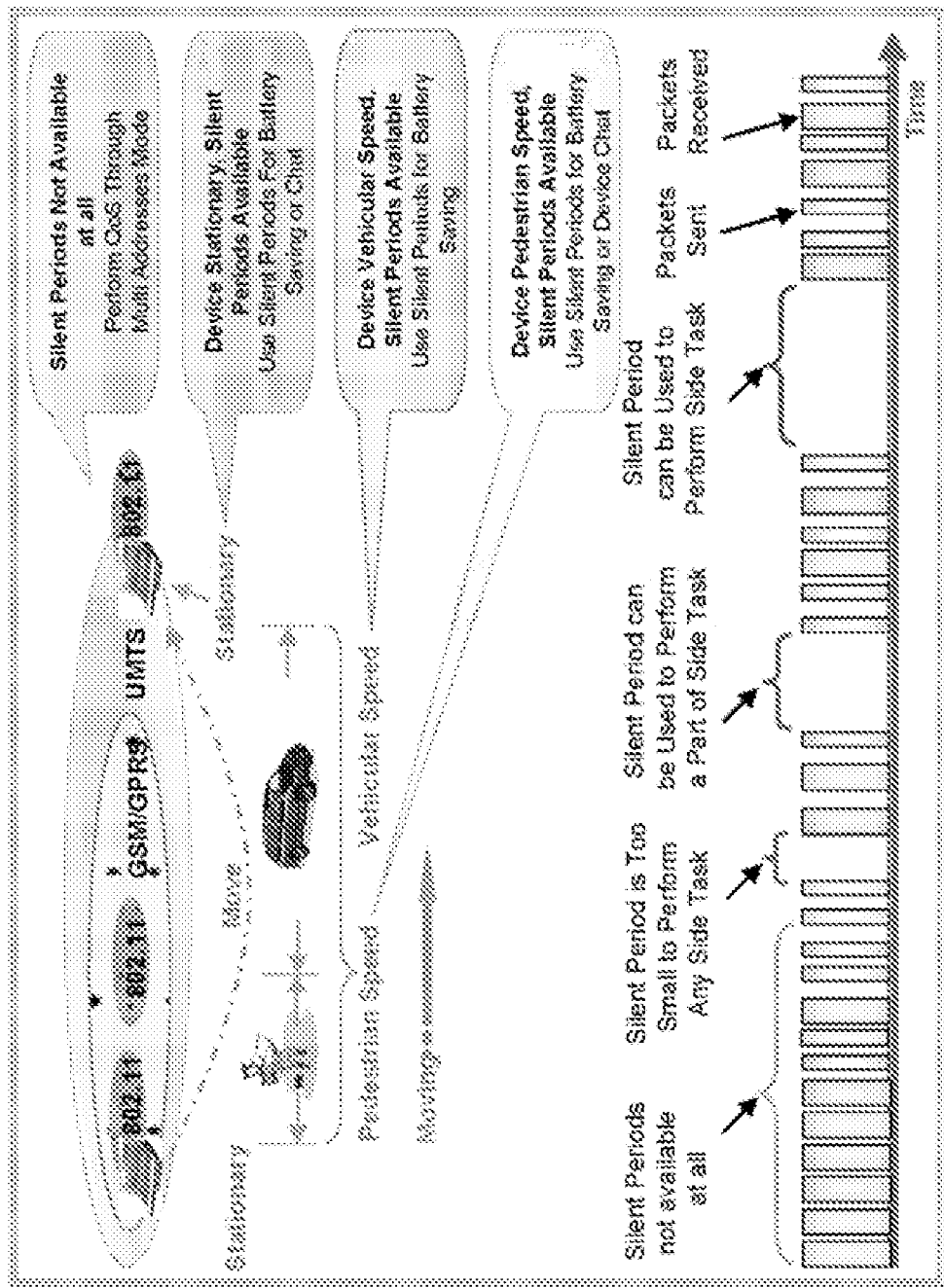
FIG. 3 : Applications and Situation Aware Utilization of Silent Periods

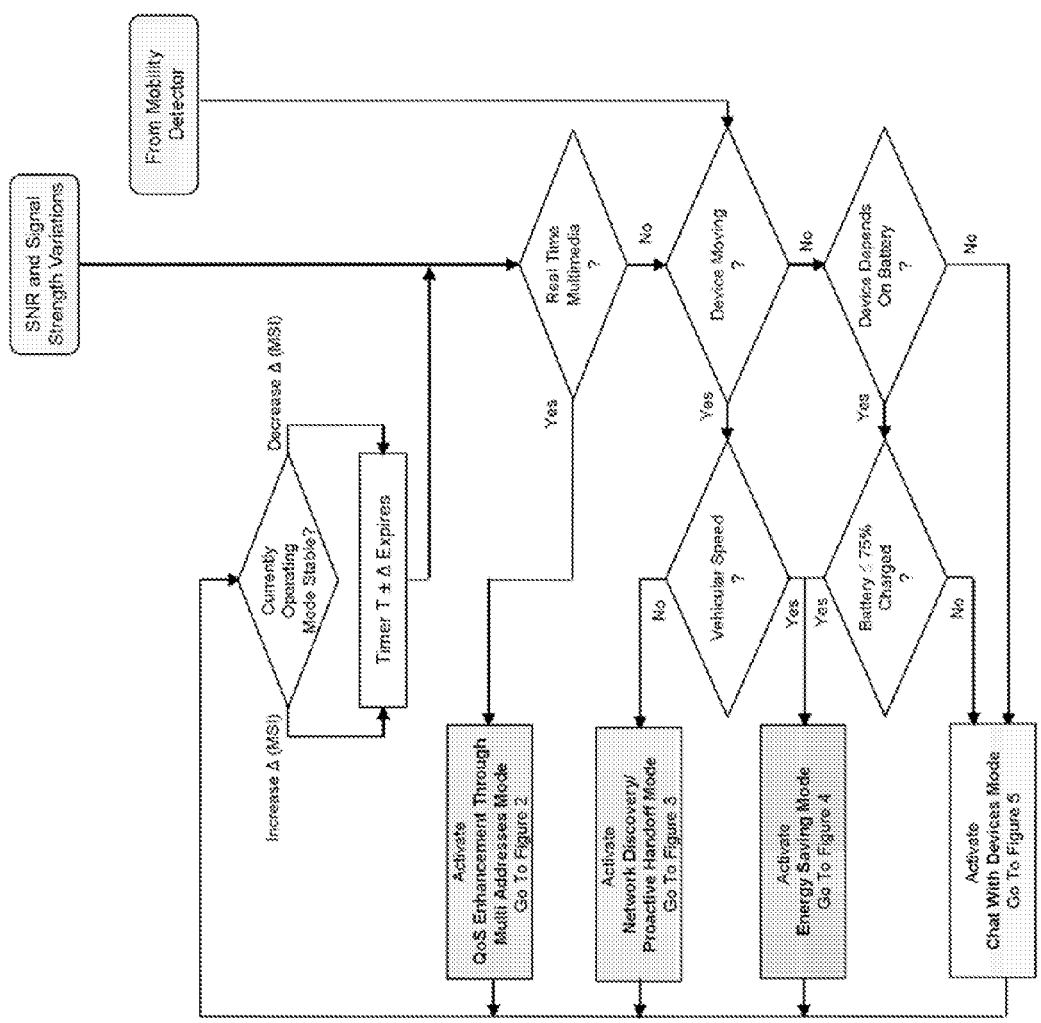
FIG. 4: Automatic Mode Selector

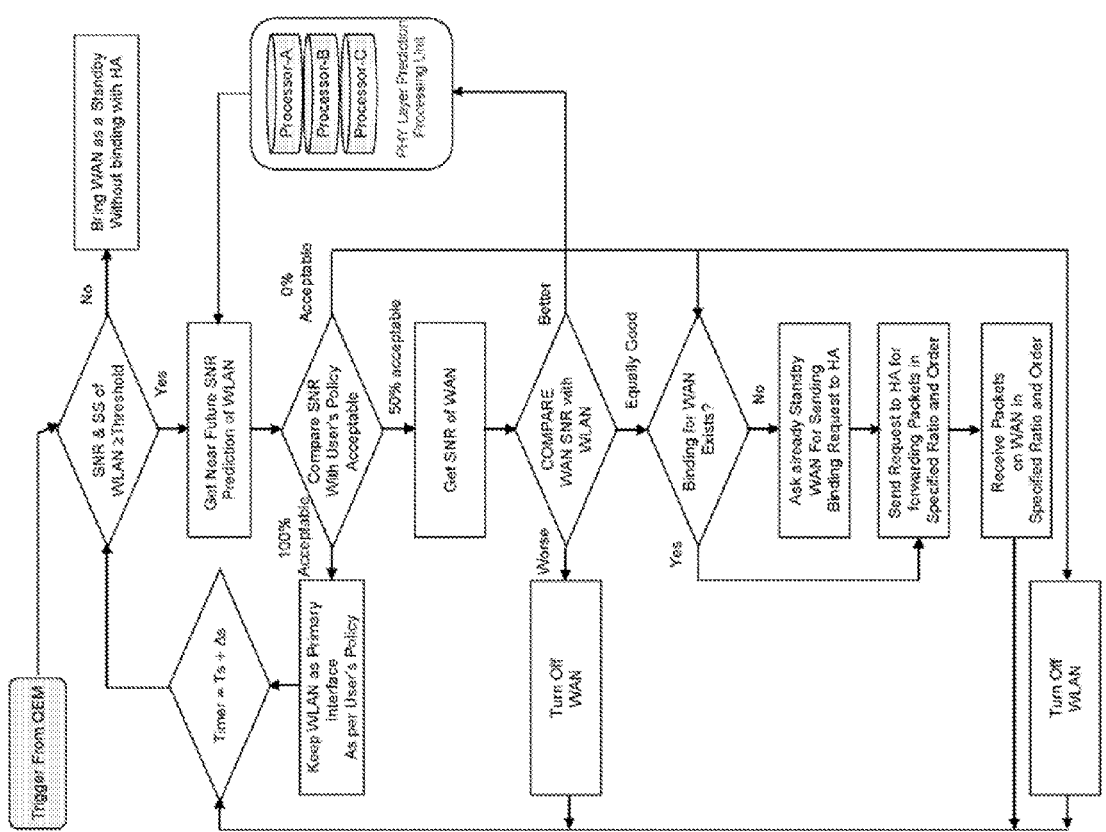

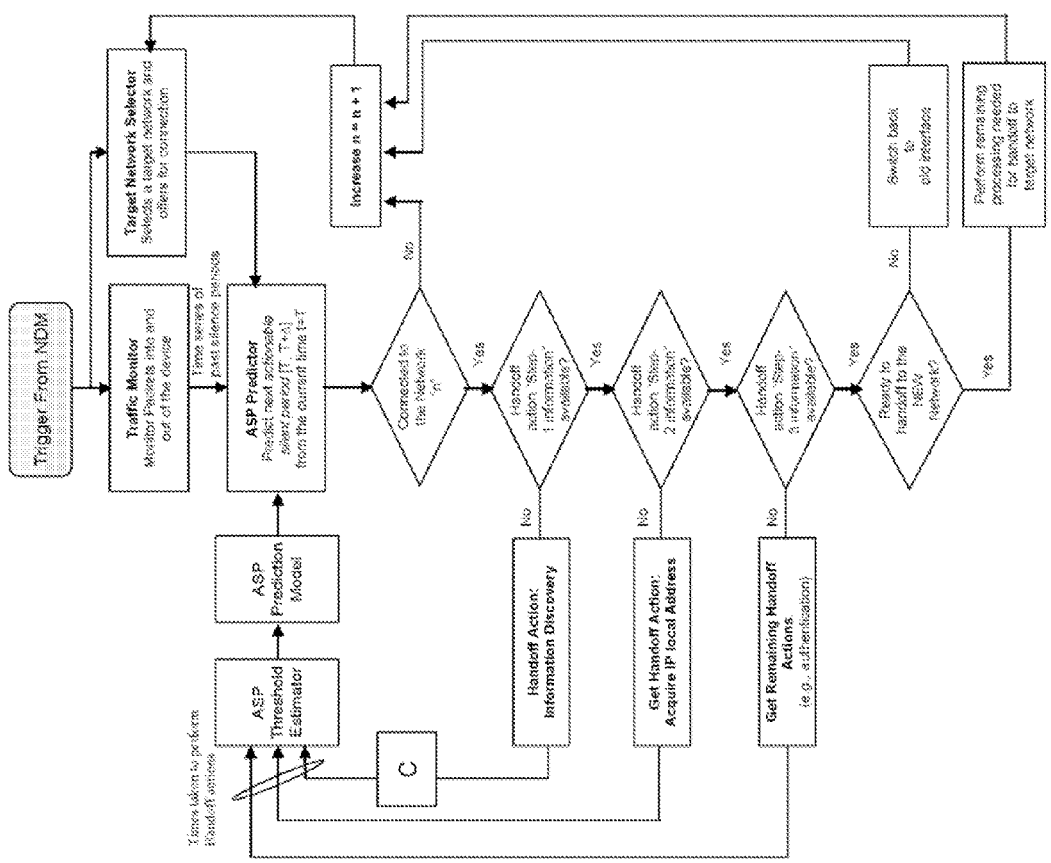
FIG. 6: Network Discovery/Silent Proactive Handover Mode

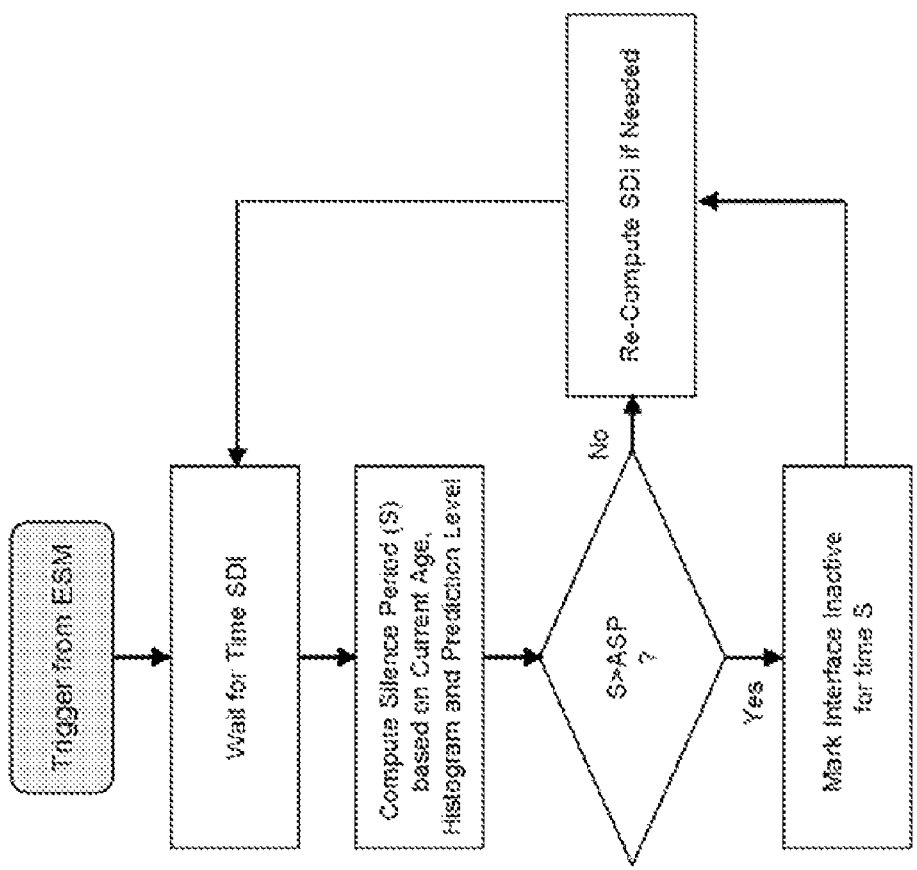
FIG. 7: Energy Saving Mode

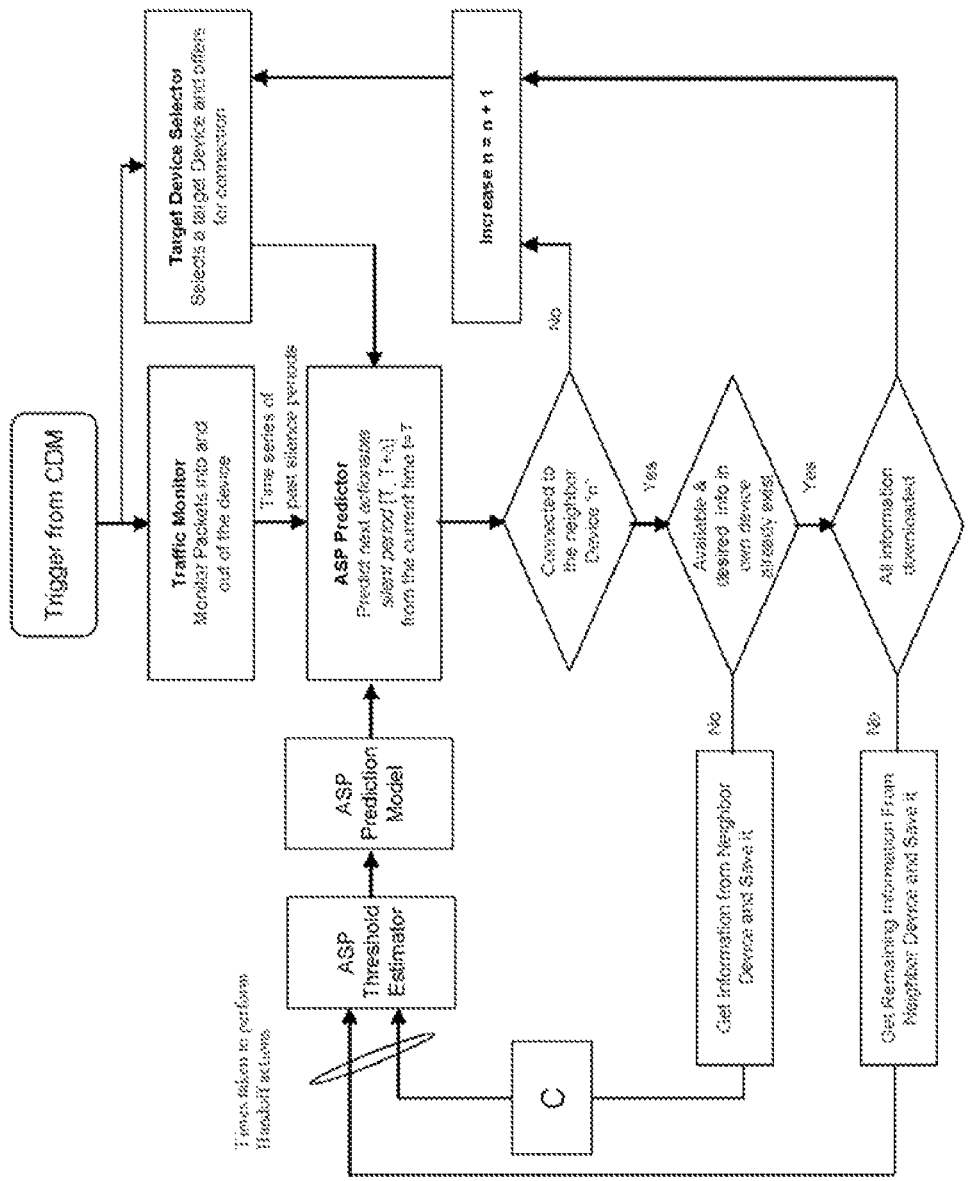
FIG. 8: Chat with devices mode

APPLICATIONS AND/OR SITUATION RESPONSIVE UTILIZATION OF SILENT PERIODS

The present application claims priority under 35 U.S.C. 119 to prior provisional application Ser. No. 60/763,520, filed on Jan. 31, 2006, having the same title and inventors as the present application, the entire disclosure of which is incorporated herein by reference.

BACKGROUND OF THE INVENTION

1. Field of the Invention

The present invention relates generally to wireless networking and more particularly to systems and methods for improved utilization of silent periods in wireless devices.

2. General Background Discussion

Wireless Networks

Wireless networks can incorporate a variety of types of mobile devices, such as cellular and wireless telephones, laptop computers, wearable computers, cordless phones, pagers, headsets, and PDAs (Personal Digital Assistants). Such mobile devices may include network interfaces to enable fast wireless transmission and reception of voice and/or data over the wireless network. Typical mobile devices include some or all of the following components: a transceiver (i.e., a transmitter and a receiver, including single chip transceivers having integrated transmitters and receivers); an antenna; a processor; one or more audio transducers (for example, a speaker or a microphone); a data storage medium (such as ROM, RAM, EPROM, hard disk, etc); operational memory; a full chip set or integrated circuit; and interfaces (such as USB, CODEC, UART, PCM, etc.).

Wireless LANs (WLANs) may be employed for wireless communications wherein a user can connect to a local area network (LAN) through a wireless (e.g. radio frequency) connection. Wireless communications also can include signal propagation via light, infrared, and microwave transmission. There are a variety of WLAN standards that currently exist, such as, e.g., Bluetooth, IEEE 802.11, and HomeRF.

The IEEE standard known as 802.11 specifies technologies for wireless LANs and devices. Using 802.11, wireless networking may be accomplished with each single base station supporting several devices. Mobile devices may be pre-equipped with wireless hardware or a user may install a separate piece of hardware, such as a card, that may include an antenna. In addition, Multiple Interface Devices (MIDs) may be utilized in some wireless networks. MIDs may contain two or more independent network interfaces, such as Bluetooth interface and an 802.11 interface, thus allowing the MID to participate on two separate networks as well as to interface with dedicated Bluetooth devices. The MID may have an IP address and a common IP (network) name associated with the IP address.

Wireless network devices may include Bluetooth devices, Multiple Interface Devices (MIDs), 802.11x devices (i.e., IEEE 802.11 devices including 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including an IP address, a Bluetooth Device Address, a Bluetooth Common Name, A Bluetooth IP address, a Bluetooth IP Common Name, an 802.11 IP Address, an 802.11 IP common Name, or an IEEE MAC address.

BACKGROUND REFERENCES

Each and every one of the following background patent applications and references, References [1] to [6], are incorporated herein by reference in their entireties as though recited herein in full.

[1]. U.S. patent application Ser. No. 11/096,721, entitled SILENT PROACTIVE HANDOFF FOR FAST ROAMING, filed on Apr. 1, 2005, to T. Zhang, et al.

[2]. U.S. patent application Ser. No. 11/161,668, entitled REDUCING ENERGY CONSUMPTION ON MOBILE DEVICES WITH WIFI OR OTHRE HIGH ENERGY-CONSUMING NETWORK INTERFACES, filed on Aug. 11, 2005, to T. Zhang, et al.

[3]. U.S. patent application Ser. No. 11/161,298, entitled PEER-TO-PEER NETWORK AND USER INFORMATION DISCOVERY AND SHARING FOR MOBILE USERS AND DEVICES, filed Jul. 28, 2005, to T. Zhang, et al.

[4]. U.S. patent application Ser. No. 12/531,814, entitled PACKET LOSS PREVENTION AND BANDWIDTH ENHANCEMENT FOR MULTIPLE INTERFACE DEVICES (MID) USING DUPLEX COMPARATOR, to R. Yaqub.

[5]. Ryuji Wakikawa, Keisuke Uehara, Thierry Ernst, and Kenichi Nagami, I.E.T.F. Internet Draft, "Multiple Care-of Address Registration" draft-ietf-monami6-multiplecoa-01.txt. October, 2006.

[6]. U.S. patent application Ser. No. 11/267,590, entitled Network Discovery Mechanisms, filed Nov. 7, 2005, to K. Taniuchi, et al., and U.S. patent application Ser. No. 11/464,188, filed Aug. 11, 2006, entitled Network Discovery Utilizing Cellular Broadcasts, to R. Yaqub.

SUMMARY

Emerging mobile devices are being equipped with multiple interfaces allowing users to take advantage of heterogeneous radio technologies. However, more advantage could be reaped if the mobile uses its network interfaces according to the applications and situations responsiveness. We perceive that the needs of the devices are different when they are running real-time applications as compared to when they are running non-real-time Applications. Furthermore, the needs of the device may be different when it is on the move as compared to when it is stationary. More precisely when the devices are running applications such as voice-over-IP (VoIP) or streaming media they are bombarded with continuous or heavy data; perhaps without much pause or break thus not leaving long and useable mute periods. Under this situation devices may use multiple interfaces for Bandwidth or Quality of Service (QoS) enhancement. Whereas while running non-real-time applications, they are not heavily flooded with continuous stream of data, rather the data flow is bursty and thus there may appear intervals when the devices can take a momentary pause (i.e., the Device has no traffic to send or receive). These short pauses are dubbed in available literature as "Silent Periods".

Depending on the application, the length of silent periods may vary. If the silent periods exist and are of sufficient lengths and the device can predict their lengths, they can be used to perform several tasks. For example, if the Device is moving at pedestrian speeds, it can use the silent periods for connecting to target neighboring networks temporarily and performing proactive handoff actions. These actions may involve connecting to a target network for acquiring IP-layer and/or high layer information necessary to connect to or authenticate with a target network. And, if the Device is stationary, it can use these silent periods for either Battery Life Saving or for chatting with fellow devices for sharing information. Use of Silent Periods has been suggested in our previous work for (i) Performing Proactive Handoff Actions (see Reference [1] cited above) and (ii) Energy Saving (see Reference No. [2] cited above). However, how to make use of silent periods based on application's needs and in a situation awareness manner has not been discussed in prior arts. Furthermore, peer-to-peer information sharing has been suggested but not utilizing the Silent Periods.

This document describes methods for efficient utilization of Silent Periods for multiple tasks such as Proactive Handoff, Energy Saving, and Device Chat. This document also explains switching/shifting between the tasks based on the current application running on the device and the current situation of the Device within which it is operating. Thus based on the Application and Situation, the device will select and operate in one of the following four appropriate modes of operation and also will be capable of switching from one mode of operation to another automatically.

QoS Enhancement Through Multiple Address Mode (abbreviated as QEM);
Network Discovery/Proactive Handoff Mode (abbreviated as NDM);
Energy Saving Mode, (abbreviated as ESM); and
Chat with Devices Mode (abbreviated as CDM).

According to some embodiments, a method of controlling a wireless mobile having multiple interfaces, comprising: having the mobile be aware of its applications running on it; having the mobile be aware of its operating situation, and having the mobile control processes of the mobile during silent periods based on one or more of its application awareness and its operating situation awareness. In some embodiments, the method further includes having the mobile control radio interface processes based on one or more of the application awareness and the operating situation awareness. In some embodiments, the method further includes having the mobile control radio interface processes based on both of the application awareness and the operating situation awareness. In some embodiments, the method further includes having the mobile make use of silent periods based on needs of applications running on the mobile and/or based on the operating situation of the mobile. In some embodiments, the method further includes having the mobile control processes of the mobile during silent periods based on the mobile running a non-real-time application thereon or a real-time application thereon. In some embodiments, the method further includes having the mobile control processes of the mobile during silent periods based on the mobile moving or not moving. In some embodiments, the method further includes having the mobile perform certain processes based on: a) if it is running a real-time application and it is stationary; b) if it is running a non-real-time application and it is moving; c) if it is running a non-real-time application and it is stationary; and d) if it is stationary and power consumption is not an issue.

In some embodiments, the method further includes having the mobile perform;
a) QoS enhancement if it is running a real-time application and it is stationary;
b) network discovery if it is running a non-real-time application and it is moving;
c) energy conservation if it is running a non-real-time application and it is stationary; and
d) information sharing if it is stationary and power consumption is not an issue.

In some embodiments, the method further includes having the mobile switch to a certain process automatically based on an output from a mobility detector and/or PHY layer parameters.

In some embodiments, the method further includes having the mobile activate a secondary interface to offer enhanced bandwidth if either an application needs additional bandwidth or data reception is not at a desired level. In some embodiments, the method further includes having the mobile compare one or more parameters for both a primary interface and a secondary interface of the mobile and determining if the secondary interface qualifies to assist.

In some embodiments, the method further includes that if the secondary interface qualifies to assist, a trigger is issued to the secondary interface, and the secondary interface sends a binding request to a Home Agent for a Secondary Care of Address, and the home agent uses tunneling mechanisms to forward Internet traffic, and if the secondary interface does not meet user expectations, a trigger is sent to the secondary interface, the secondary interface sends a binding request to the home agent for a care of address, the primary interface is shut down and the secondary interfaces is used for all user packets.

According to some other embodiments, a mobile apparatus is provided that includes: a plurality of network interfaces; a processor; the mobile being configured to monitor applications running on it, including real time or non real time nature of the applications; the mobile being configured to monitor its operating situation, including moving or non moving status; and the mobile being configured to control processes of the mobile during silent periods based on one or more of its application awareness and its operating situation awareness. In some embodiments, the mobile is configured to switch between modes of operation of based on the application awareness and the situation awareness, including to switch between one or more of the following modes of operation QoS enhancement through multiple address mode, network discovery mode, energy saving mode, and chat with devices mode.

According to some other embodiments, a method of controlling a mobile apparatus includes: controlling the mobile to make efficient use of silent periods due to unoccupied brief intervals of wireless traffic data by automatically switching between multiple tasks performed during the silent periods depending on a traffic volume of at least one application running on the mobile apparatus and a motion condition of the mobile.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The description of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 3 is a schematic diagram illustrating applications and situation aware utilization of silent periods;

FIG. 4 is an illustrative flow diagram related to an automatic mode selector according to some illustrative embodiments of the invention;

FIG. 5 is an illustrative flow diagram related to a quality of service (through multi-addresses) mode according to some illustrative embodiments of the invention;

FIG. 6 is an illustrative flow diagram related to a network discover/silent proactive handover mode according to some illustrative embodiments of the invention;

FIG. 7 is an illustrative flow diagram related to an energy saving mode according to some illustrative embodiments of the invention; and FIG. 8 is an illustrative flow diagram related to a chat with devices mode according to some illustrative embodiments of the invention.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Multiple Interface Devices

Once again, emerging mobile devices are being equipped with multiple interfaces allowing users to take advantage of heterogeneous radio technologies (such as, by way of example, cellular networks and wireless LANs). For purposes of illustration and explanation, some examples may be described, e.g., with respect to a mobile device with a WiFi or other high energy-consuming network interface. Throughout the remainder of the disclosure, for purposes of simplicity, the term WiFi is used to represent a high energy-consuming interface on a mobile device. The mobile device also may have additional network interfaces such as cellular network interfaces (e.g., GPRS, CDMA2000, 3GPP, 3GPP2). Examples of such mobile devices include WiFi phones and PDAs, and WiFi-cellular dual-mode phones and PDAs.

It is contemplated that future wireless networks will use multiple radio technologies to meet different communication needs. For example, short-range radio technologies (e.g., Bluetooth) may be used to connect nearby devices (e.g., devices carried by a person or inside an office, vehicle, or home); private or public wireless LANs (e.g., IEEE 802.11) for continuous coverage throughout a building, a campus, an airport, a shopping mall, and cellular radio systems (e.g., GSM, GPRS, cdma2000, WCDMA) for wide-area coverage. Therefore, mobile devices (also referred to herein as mobiles) are being equipped with multiple radio interfaces, each supporting a different radio technology.

Figure 1A:
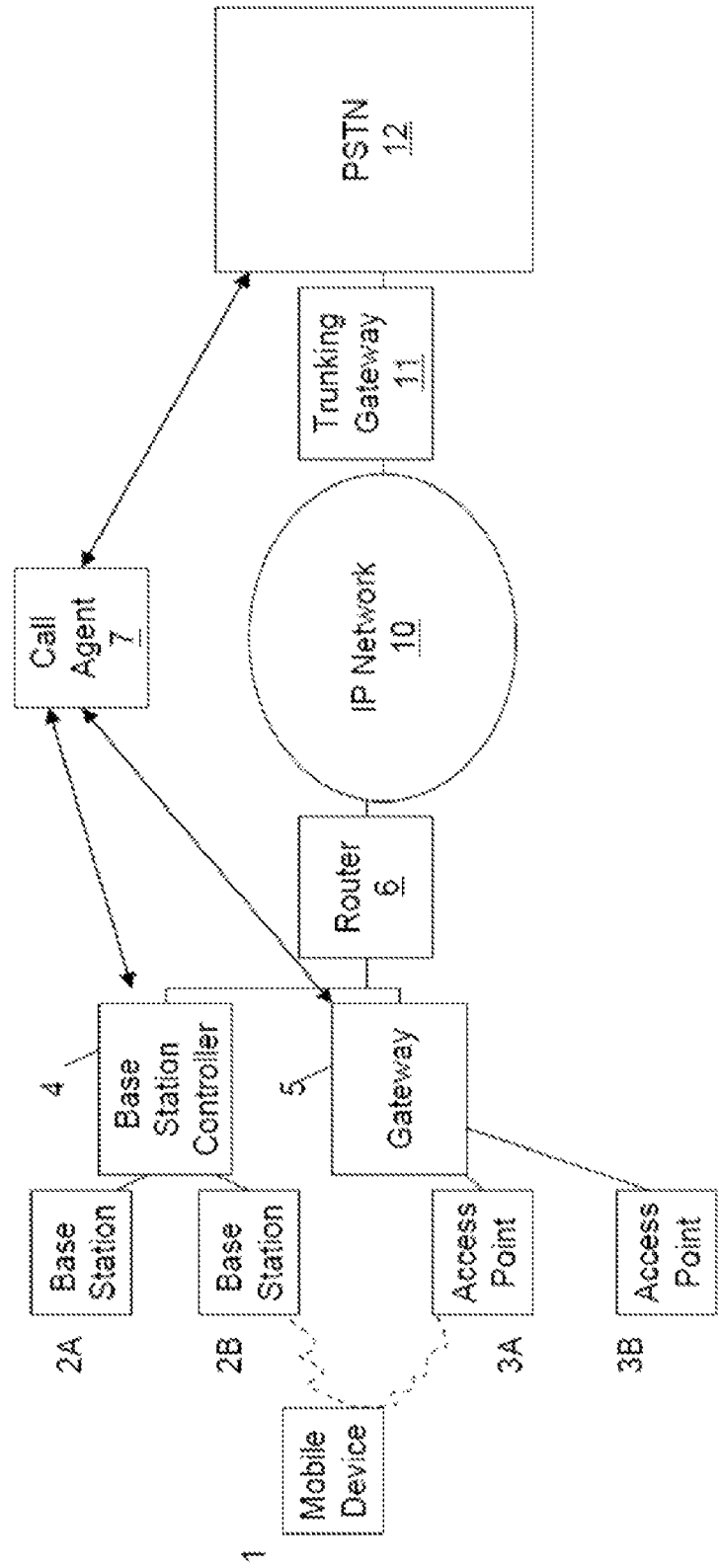
FIG. 1(A) is an architectural diagram depicting an illustrative environment in which a mobile device having a plurality of interfaces communicates with a plurality of networks.

By way of example, FIG. 1(A) shows an illustrative network configuration in which a mobile device 1 is shown as having interfaces for communicating with base stations 2A, 2B and access points 3A, 3B. In this illustrative example, the base stations 2A and 2B are shown as communicating with a base station controller 4 that in turn communicates with a call agent 7 which is in communication with the public switched telephone network (PSTN) 12. As also shown, the access points 3A and 3B can include, e.g., IP network access points and can be in communication with a gateway 5 that communicates, in turn to a router 6 that communicates via an IP network 10, such as, e.g., the Internet, via a trunking gateway 11 to the public switched telephone network 12.

Figure 1B:
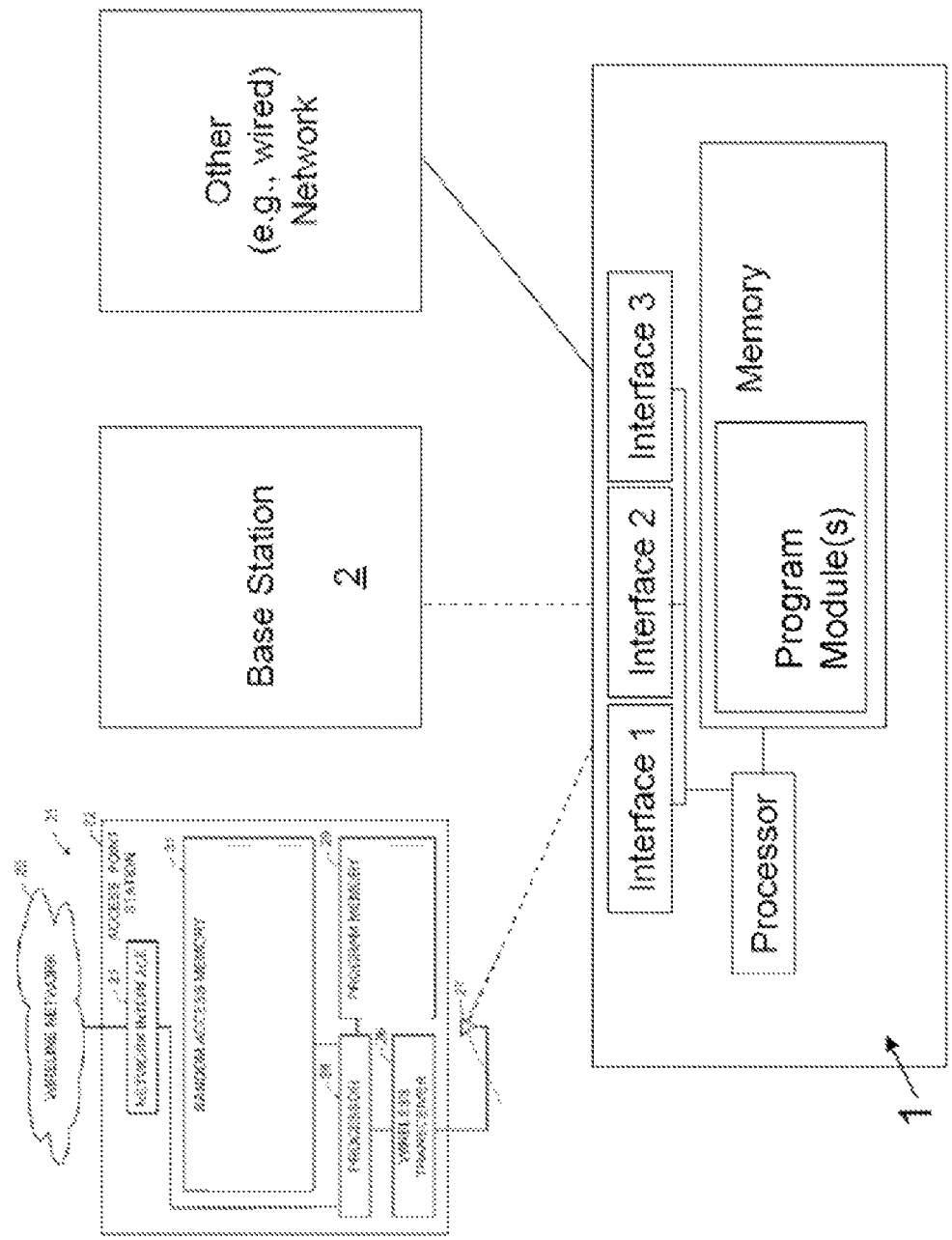
FIG. 1(B) is another architectural diagram depicting an illustrative environment in which a mobile device having a plurality of interfaces communicates with a plurality of networks, and also illustrating some components of an illustrative mobile device and an illustrative access point with which the mobile device communicates in a first network.

With reference to FIG. 1(B), in some illustrative examples a mobile device 1 can include a plurality of interfaces. In the illustrated example, three interfaces are shown: Interface 1; Interface 2 and Interface 3. However, in various embodiments any number of interfaces can be employed. In illustrative embodiments, a mobile device can include, e.g., portable computers, personal desk-top computers, PDAs, portable voice-over-IP telephones and/or other devices. Typically, such mobile devices will include a transceiver (including an antenna for communication with the access point), a processor, memory (including, e.g., program memory and Random Access Memory). As also shown, the memory can include programs or modules for carrying out functionality as described herein-below. In various embodiments, processes to be carried out by the mobile device can be performed via software, hardware and/or firmware as may be appropriate based on circumstances.

In an illustrative embodiment shown in FIG. 1(B), a mobile device 1 is shown that is capable of communicating via a plurality of networks, such as, e.g., via Interface 1-3. For example, the mobile device can communicate via the Access Point 22 or via a Base Station 2, similar to that shown in FIG. 1(B). Additionally, FIG. 1(B) also schematically depicts an example in which the mobile device 1 can also communicate with another network, such as, e.g., another wireless network or a wired networks. With reference to FIG. 1(B), in some illustrative and non-limiting embodiments, the access point 22 can be within a wireless local area network (WLAN) connected to a wireline network 20. In some examples, the wireline network 20 can include the Internet or a corporate data processing network. In some examples, the access point 22 can be a wireless router. In some embodiments, the access point 22 can have a network interface 25 linked to the wireline network 21 and a wireless transceiver in communication with the mobile device 1 and with other mobile devices. By way of example, the wireless transceiver 26 can include an antenna 27 for radio or microwave frequency communication with the mobile devices. The access point 22 preferably also has a processor 28, a program memory 29, and a random access memory 31.

Figure 2:
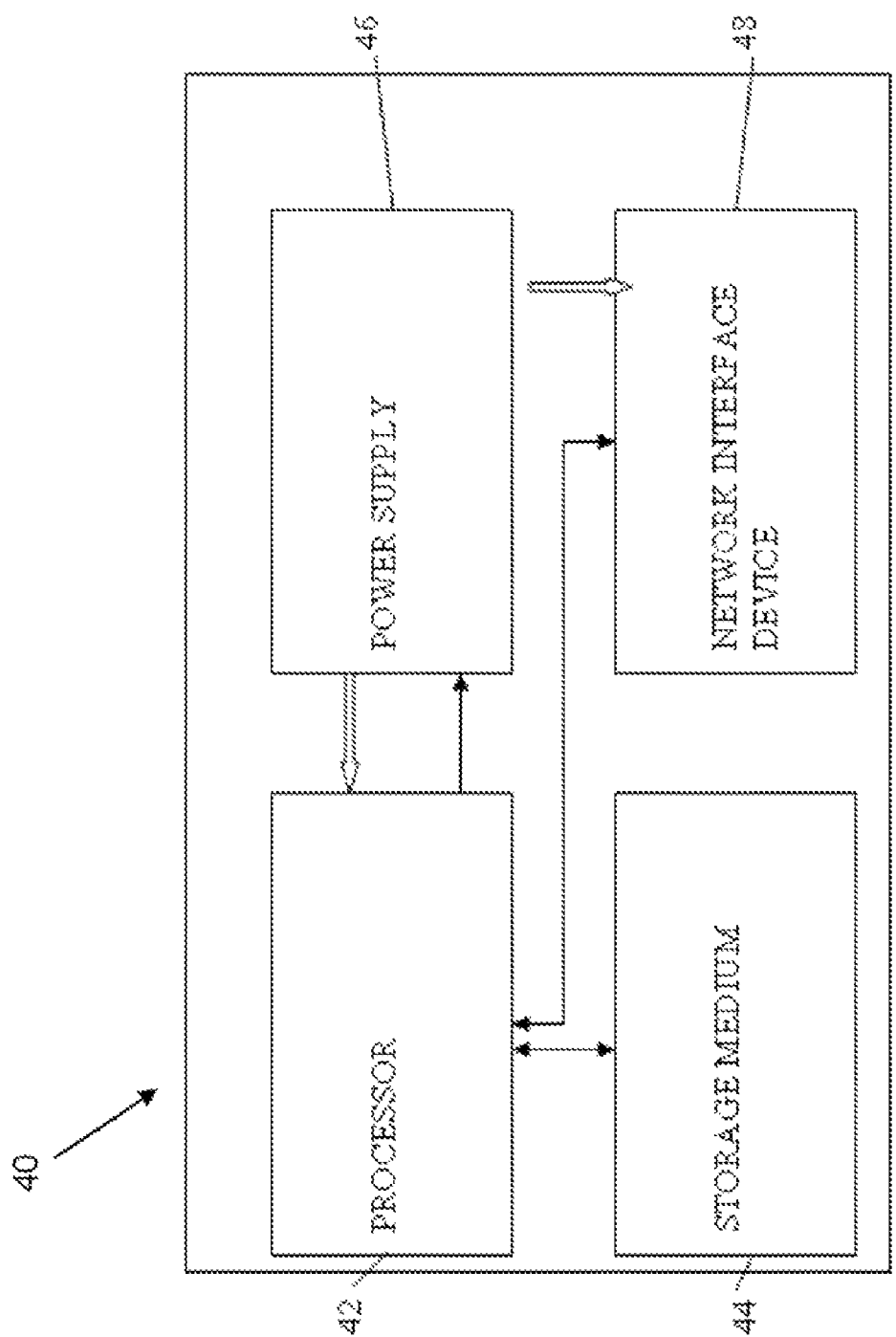
FIG. 2 is a block diagram of a network-enabled mobile communication device according to one embodiment of the present invention.

FIG. 2 is a block diagram of a generic mobile device 40 of an illustrative type that may incorporate one or more of the concepts and features of embodiments of the present invention. In this illustrative example, the device 40 includes a processor 42 and storage medium 44 in the form of a disk, ROM, RAM, flash memory, etc. The storage medium may store processor-executable application instructions for performing the silent period prediction according to the invention as described above. The device 40 further includes a power supply 46 and network interface device 48, which may be an internal Network Interface Card (NIC), external network interface device or integrated network interface. Power supply 46 provides power to the processor 42 and to the network interface device, as well as to other components of the mobile device (not shown).

Introduction to the Preferred Embodiments

Once again, over time more and more emerging mobile devices will be equipped with multiple interfaces, such as, e.g., Wireless Local Area Networks, abbreviated as WLANs (such as, e.g., IEEE 802.11 family) and Wide Area Networks, abbreviated as WANs (such as, e.g., GSM, GPRS, cdma2000, WCDMA, WiMax). These Multiple Interface Devices (MID) allow users to take advantage of heterogeneous radio technologies—for example, they may use WLANs for higher data rates and WANs for better coverage. However, more advantage could be reaped if the MID use its network interfaces in response to the Application running on and or Situations they are operating in. For example, the response of the MID should be different when they are running Real-time Applications (RTA) as compared to when they are running non-Real-time Applications (NRTA). For example, when the devices are running applications such as VoIP or streaming media, it should be appreciated that the MID is overwhelmed with heavy data. Under this situation, it may use the multiple interfaces for Bandwidth/QoS enhancement. Whereas, while running NRTA, the MID is not heavily flooded with bits and bytes, and there may appear intervals when the MID can take a brief pause (e.g., in which the mobile has no traffic to send or receive). These unoccupied brief intervals are referred to as "Silent Periods." Depending on the application, the duration of these silent periods may vary. The Silent Periods, "if available", and "if of reasonable duration", and also "if accurately predicted" (for example, by monitoring the incoming and outgoing user traffic though a network interface) can be used to perform several tasks. For example:

(a). Consider a moving MID inside the overlapping radio coverage areas of multiple radio networks. It desires session continuity, with minimum packet loss, when it hands off from one radio Access Point to another. Under this condition, if it could get the necessary IP and higher layer parameter values necessary to connect to or authenticate with a target network in advance, it could conduct a quick handoff. To get the required information in advance, it may use the silent periods to connect to target neighboring networks temporarily i.e., only during these silent periods and use the temporary connectivity to get the desired information and perform key actions needed for handoff into the target network.

(b). Consider an MID is Stationary. When a device is stationary, and if one network interface provides sufficient support for the applications running on the device, the device may power off the other network interfaces to save battery energy. Furthermore, if the device could accurately predict the silent periods, it may also power off the network interface it is currently using to transport application traffic during the silent periods. Powering down an interface during silent periods will not lead to missing or delaying any traffic that needs to come into and go out of this interface.

(c). Consider an MID is Stationary and Electrical Power is Not a Constraint. If the device is stationary and power saving is not a real concern (e.g., because the device is connected to the power outlet, or it has additional batteries), the MID may use silent periods to chat with other MIDs to share the information they collected about the networks they visited in the past. For example, a MID visited a Network "A" in the past and learned the parameters needed by a MID to authenticate with that network (from the radio signals it received from "Network-A" or as a result of connecting to the "Network-A"). It preserved the information, primarily for its own future use, and carried this information with it into a neighboring network "Network-B". Here it can share the information directly, in a peer-to-peer fashion, with those who wish to known that sort of information. Thus the interested devices obtain the desired information through chatting with peer MIDs without actually connecting to any network. These devices can save the shared information for future use for accessing services or for performing pre-handoff processing to Network-B, if they happen to visit Network-B.

(d). Consider MID is stationary and is running real-time application say for example using WLAN, MID perceives that available bandwidth does not meet the present need of his time sensitive applications (because, e.g., several users are contending for the WLAN bandwidth and the Silent periods are unacceptably long). To cope with this situation, MID may turn WAN interface ON in addition to WLAN for bandwidth increment. Turning ON WAN in addition to WLAN would require (i) having dual addresses one for WAN and one for WLAN, (ii) binding association of both the addresses with home network, (iii) informing home network about preferred packet forwarding policy on two different paths/addresses. (iv) and having coverage of both WLAN and WAN. Thus using multiple interfaces (Multiple Addresses or in other words multiple data paths), the MID will lead to enhance bandwidth.

This document suggests the efficient use of silent periods for multiple tasks depending on the nature of application (real-time or non real-time) and on the condition of state/situation (stationary or moving). If the application in non real-time and the device is stationary, and also if the silent periods of sufficient lengths exist and can be accurately predicted they can be used to either save the battery life or for indulging in the chat with peer devices to get information of interest. If the device is moving and if the silent periods of sufficient lengths can be accurately predicted they can be used to perform proactive handoff actions. Furthermore this document also explains as to how a device can perform switching/shifting to accomplish afore mentioned multiple tasks.

In the preferred embodiments, the approach should detect:
(i) Presently Running Application (RTA or NRTA) on MID,
(ii) Present "Situation (Mobile or Stationary)" of MID, and
(iii) Occurrences and lengths of Silent Periods.

Preferably, this is done by watching incoming and outgoing user traffic through a network interface and providing the appropriate set of services accordingly. Thus, introducing flexibility to switching between different modes automatically based on the above noted observations.

In the preferred embodiments, the approach offers several desirable features, including, e.g., as outlined below.

Notion of Situation Awareness diversifies the use of Silent Periods. Thus utilization of silent periods becomes manifold which was not exposed previously.

Notion of Application Awareness makes MID smart so that it could harness available capabilities on it in a more organized way. This enables the device to tackle diversified needs in a well prepared and judicious manner, and thus provides another venue for performance enhancement and resources utilization.

Notion of both Applications and Situation awareness enables MID for watchful Multitasking. Thus it becomes capable of QoS Enhancement (if it is running real-time application and it is stationary), Network Discovery (if it is running non real-time application and is moving), Energy Conservation (if it is running non real-time application and it is stationary) and Information Sharing ((if it is stationary and is not bothered about power consumption).

In the following sections, some aspects of the preferred embodiments are set forth in greater detail.

DETAILED DESCRIPTION

The present inventors have found that if a MID becomes aware of the applications running on it, and also the situation it is operating in, most of the complex processes, circuitries, and algorithms running in the device, including radio interfaces, can be either run more efficiently or used for watchful multitasking. FIG. 3 shows an illustrative embodiment of the overall concept.

In the preferred embodiments of the present invention, situations under consideration (e.g., "Application Type", "Device Mobility" and "Battery Health") lead MID to operate in following Four Modes according to the preferred embodiments. These Modes are depicted in FIG. 4 and are of significant importance for this innovation:

QoS Enhancement Through Multiple Address Mode (abbreviated as QEM);
Network Discovery/Proactive Handoff Mode (abbreviated as NDM);
Energy Saving Mode, (abbreviated as ESM); and
Chat with Devices Mode (abbreviated as CDM).

FIG. 4 also reveals that according to the present invention, MID becomes capable of switching to appropriate mode automatically, triggered by output from the Mobility Detector and or PHY Layer Parameters. In addition, FIG. 4 also shows that the proposed scheme has the capability to check the stability of the current operating mode and to adjust (decrease or increase) the frequency of running the algorithm. Thus if the current operating mode is stable, the Mode Stability Index (MSI) is upgraded and mode checking can be performed less frequently; and if not, MSI is downgraded and mode checking can be performed more frequently.

Next, we explain how each mode works separately. However, before that some of the terms used in this document are explained below.

"Primary Interface (PI)" is the network interface a device selects as default based on user's policy.

"Secondary Interface (SI)" is a network interface a device selects either in the Absence of PI, or to Assist PI for performance enhancement. Performance enhancement may include provisioning of additional bandwidth particularly if the application is bandwidth hungry, or if the available throughput/bandwidth/SNR is declining due to radio signal deterioration.

The term MID used in this document may mean the device itself, or the user who is processing an MID. Also, in this disclosure, the term MID presents (i.e., encompasses) solitary as well as a plurality. The meaning will be clear in reference to the context in which they are used.

ASP stands for Actionable Silent Periods, meaning the brief durations between successive packets that are useable for conducting a task or a subset of any task.

Operation of QoS through Multiple Address Mode (QEM):

Operation of QEM is illustrated in flow diagrams FIG. 5. This Figure shows that the process receives a trigger from the Automatic Mode Selector of FIG. 4. The spirit of this mode is to bring SI ON primarily to offer enhanced bandwidth if either application is bandwidth hungry or data reception is not up to user's expectations for bandwidth increment. To achieve these objectives the algorithm brings SI ON if either the user is not 100% satisfied with PI as it is not offering adequate bandwidth for the presently running application or if PI is not available at all (i.e. 0% user's acceptability). To make out if the SI truly qualifies to offer bandwidth increment, the algorithm compares following parameters of both the PI and the SI.

1. Present Condition of Signal to Noise Ratio (SNR) and Signal Strength (SS);
2. Near Future Predicted SNR and SS received from the Prediction Unit; and
3. User's Policy, established by user in User Policy Repository (not shown in the figures).

In case SI qualifies to assist PI for bandwidth increment, the "QoS through Multiple Address Mode" algorithm issues a trigger to SI. This makes SI to send a binding request to Home Agent for Secondary Care of Address (CoA). A home agent is a router on a mobile node's home network. It uses tunneling mechanisms to forward Internet traffic so that the device's IP address doesn't have to be changed each time it connects from a different location. It maintains information about the device's current location, as identified in its care-of address. CoA is a temporary IP address for a mobile device that enables device to connect from a different location without changing the device's home address (permanent IP address). CoA may be acquired through some means such as Dynamic Host Configuration Protocol (DHCP). When a message for the mobile node is delivered to the home network, the home agent intercepts the message and tunnels it to the recipient at the care-of address. These terms are defined in the Internet Engineering Task Force (IETF) RFC 2002 specification. In binding request it also informs HA the preferred packet forwarding policy by specifying ratio (e.g. PI:SI=75:25) and order in which it wants to receive packets on two interfaces (by way of example, packet with even sequence numbers on PI and packets with odd sequence numbers on SI, or flow type, or port number, etc).

In case SI does not qualify, it is turned off for time "(Ts+Δs)" which stands for Sleep Time. Since the device is stationary and the SI is WAN (we assume in this paper WLAN to be the PI as it offers more bandwidth at less cost, even though geographical coverage is less; and WAN to be the secondary as it offers less bandwidth and more cost even though geographical coverage is better. However, the assumed preference can be changed as defined by user in User policy), it is assumed that radio characteristics may not change drastically over a short period of time. Therefore value of (Ts+Δs) can be set higher to allow more sleep time. The Δs is the amount of increment or decrement on PHY layer predictor's input (as described in section 2.6 of this document). It can also be made a function of behavioral historical log of the MID through learning process.

In case PI does not meet user's expectations at all (0% acceptability), the algorithm issues a trigger to SI. This makes SI to send a binding request to HA for Care of Address (CoA). It also turns off PI and thus HA sends all user packets on SI (i.e. ratio PI:SI=0:100). In this case SI acts as PI, however PI is checked at regular time intervals (Ts+Δs) to see if it can provide the required support for the applications.

It is to be noted that if the SNR is below or equal to the PHY layer parameters threshold as shown in FIG. 5, Qualified SI is already triggered ON to stay standby acquiring an IP address but not having binding/registration with HA yet. Binding will be performed when binding trigger is issued. De-registration of any deteriorating or unavailable interface will be done through any available interface.

According to the current Mobile IPv6 specification, a mobile node may have several care-of-addresses, but only one, termed as "primary care-of-address", can be registered with its HA. To have multiple active IPv6 Care-of-addresses, some extensions to Mobile IPv6 are needed. One possible way, as discussed in Reference No. [5] cited above suggests using a new "Unique Binding ID" that must be carried in each binding request. The home address thus identifies a mobile node itself where as Unique Binding ID identifies each binding registered by the mobile node. If the care of address is a primary one, it may set the P flag in the Unique Binding ID. If a mobile decides to delete all bindings for its home address, it sends a regular de-registration binding update i.e., unset of b flag and excludes Unique Binding ID. If a mobile wants to delete a particular binding that could be done by specifying that address.

Results of comparison to the Prediction Processing Unit are also sent.

Operation of Network Discovery/Proactive Handoff Mode (NDM):

Operation of NDM is explained in FIG. 6. This Figure shows that the process receives a trigger from Automatic Mode Selector of FIG. 4. On receiving the trigger, Traffic Monitor starts monitoring the time-gaps in between packets entering and leaving the MID over the network the MID is currently using. Actionable Silent Period Predictor uses the output from the Traffic Monitor and a prediction model to detect the next ASP and the duration of that ASP. Any prediction model, e.g., Wiener Process Models, or Time Series Models (such as the auto-regression) as explained in Reference No. [1] cited above may be used.

The ASP Predictor can dynamically estimate the ASP Thresholds based on the times the MID took to perform handoff actions in the recent past. The ASP Thresholds are estimated dynamically by an ASP Threshold Estimator and an ASP Prediction Model. The ASP Threshold Estimator takes as input the times the MID took to perform the handoff actions in the recent past as illustrated in FIG. 6. It can then use statistical models, to estimate the minimal time it has recently taken the MID to perform each handoff action and use it as the ASP threshold for each handoff action. The estimated ASP Thresholds are then sent to the ASP Prediction Model, which uses these thresholds and the inter-packet times form the Traffic Monitor to detect the next silent period, predict if this next silent period will be an ASP, and predict the length of the next ASP.

In parallel, a functional component Target Network Selector selects a target network to which the MID may switch to next. Target network selection can be based on any criteria deemed appropriate to satisfy the requirements of the MID and the applications running on the device. These criteria may include the detection of a new radio network, when the radio signal strength of the current network drops to a threshold.

When a target network is selected and an actionable silent period is detected, the MID switches its radio connection and layer-2 connection to the target network. If it fails to establish a connection to the target network (e.g., if its layer-2 authentication fails), the Target Network Selector is notified and it will start to select second a new target network.

After the MID connects successfully to the target network and the current ASP has not yet expired, the MID enters the Information Discovery phase to listen to the target network's layer-2, IP-layer, and/or application-layer advertisement messages to learn about the necessary information needed to perform handoffs at different protocol layers to the target network. If the MID has already acquired the information it needed about this target network, it will skip this information discovery phase and go directly to the next step as shown in FIG. 6.

If the current ASP does not expire after the information discovery phase, the MID starts a handoff action, e.g., to obtain a local IP address from the target network. A local IP address from a target network is an IP address the MID can use to receive unicast packets from the target network. If the MID has already had a local IP address from this target network, the MID will go directly to the next step shown in FIG. 6.

If the current ASP does not expire after the MID acquires and configures itself with a local IP address from the target network, it will start to perform a new handoff action, e.g., to perform the necessary authentication at the IP and application layers with the target network if these authentications are required by the target network. If the authentications fail (indicating that the MID may not be allowed to use the target network), the Target Network Selector is notified and it selects a new target network.

If after finishing some or all of the above steps, the MID is still not yet ready to handoff into the target network (e.g., if the current network continues to satisfy the MID's requirements), the MID will switch its network connection back to the old/current network.

Since the above process of switching to the target network and then switching back to the old/current network is done during the otherwise silent periods of the MID, the switching is transparent to the applications on the MID and will not cause interruptions to the applications.

As shown in FIG. 3, if an ASP, is too small, the MID will perform part or subset of side task and use the subsequent ASPs to perform the remaining task, (e.g., during one ASP, the MID may discover the addresses of the IP access router, the IP address allocation server, and the authentication server, and during the next ASP, the MID can obtain a local IP address from the target network, and perform IP or application-layer authentication with the target network).

Energy Saving Mode (Abbreviated as ESM):

FIG. 7 shows the flowchart for ESM. In this regard, the Figure shows that when this process receives a trigger from Automatic Mode Selector of FIG. 4, it starts prediction of ASP. The algorithm monitors the MID activities at the current interface to determine the ASP and its duration. Predictions are made periodically after every Silence Detection Interval (SDI). We subtract the times the MID takes to shut down and then turn back on an interface from every silent period we observe. If the result is zero or negative, we do not consider this silent period an actual or actionable silent period. If the result is positive, we consider the silent period an actionable Silent Period.

During an initial period of time, the MID constructs a histogram that describes the network activities over interface currently operating. Once the initial histogram is built, the MID starts to use the histogram to predict silent periods. It shuts down the interface during each ASP. Whenever the interface is on, the MID monitors network activities over the interface and uses the new observations of silent periods to update its histogram. The mathematical models we use for predictions, is given Reference [2] cited above. The selection of currently operating interface may be governed by user's policy. The policy may define to select the least-power-consuming interface when the device is running with critical battery life.

Chat with Devices Mode (Abbreviated as CDM):

FIG. 7 shows the flowchart for CDM. Figure shows that when this process receives a trigger from Automatic Mode Selector of FIG. 4, the Traffic Monitor starts monitoring the time-gaps in between packets entering and leaving the MID over the network the MID is currently using. Actionable Silent Period Predictor uses the output from the Traffic Monitor and a prediction model to detect the next ASP and the duration of that ASP. The ASP Thresholds are estimated dynamically by an ASP Threshold Estimator and an ASP Prediction Model as described earlier. The ASP Threshold Estimator takes as input the times the MID took to chat and discover useful information in the recent past as illustrated in FIG. 7. It can then use statistical models, to estimate the minimal time it has recently taken the device to connect to the neighbor device and get the desired information from it. The information may be of Device Interest (e.g., the addresses of the radio access points and the parameters needed to connect to them, the IP addresses of the IP access routers, the DHCP server, the authentication server and authentication protocols supported, local content, and other network) or of Human interest (e.g., Location based information about Restaurants, or Gas Stations etc). The estimated ASP Thresholds are then sent to the ASP Prediction Model, which uses these thresholds and the inter-packet times from the Traffic Monitor to detect the next silent period, predict if this next silent period will be an ASP by predicting the length of the next ASP. Thus in any ASP, the MID firstly, connect the neighbor device, and then exchange/collect device-interest/user-interest information regarding each network they visit as part of their routine use of the network.

As described earlier, if an ASP is too small, the MID will perform part or subset of side task and use the subsequent ASPs to perform the remaining task, (e.g., during one ASP, the MID may discover the device willing to share the information, and during the next ASP, the MID can obtain desirable information, and yet during the next ASP the device obtains the rest of the information, if not completely obtained in the previous ASP.

Description of Motion Detector Processor (MDP):

Mobility Detector is a software processor abbreviated as MDP. It performs significant role in this scheme. As shown in FIG. 4, MDP dynamically guides MID for using most effective mode of operation, i.e.:

If MID is stationary, it triggers either ESM or CDM Mode depending on the battery health. This mode resolves to turn off unneeded interfaces, algorithm etc. (i.e. pertaining to mobility management). Only one interface is kept ON unless the application calls for any of other interface for bandwidth increment.

If the MID is moving with a pedestrian speed (say 1-10 KMH), it triggers on NDM Mode. NDM resolves to turn on Proactive Handoff mechanism for packet loss recovery and smooth session transition between heterogeneous interfaces (e.g., from WLAN to WAN or from WLAN to WLAN) if needed.

If MID is moving with the vehicular speed (10-100 MPH), it triggers on ESM mode. ESM resolves to conserve battery life.

Mobility Detection Process can use one or plurality of the following methods to estimate the MID's speed. Since determining exact speed is not the objective, but coarse estimate (e.g. Zero, between 1 and 10 KMH, and more than 10 KMH) the following methods can solve our purpose quite effectively.

MDP can easily determine if the device is almost stationary from one of the following measurements.

1. Use the predicted diameter of networks and estimate the time it takes a MID to traverse that network. Record the time the MID traversed similar types of networks in the recent past. For example, IEEE 802.11 networks have similar coverage ranges. Therefore, the MID can estimate the time it will spend in the next 802.11 network based on the times it has just spent in each 802.11 network in the recent past.

2. Checking Mapping with Subnet address could be another way of finding if the device is stationary or not. If the Subnet Address does not change MPD can have an educated guess that the device is almost stationary.

3. The MAC (Media Access Control) layer signals in most radio networks allow a MID to determine when it will receive the next radio beacon from a certain network. For example, an IEEE 802.11 Basic Service Set (BSS), which is a set of Access Points that form a local area wireless network, typically sends beacons in 100 ms intervals. If the MID receives all the consecutive beacon signals at regular time intervals, for example, (100+$\Delta$T) ms where $\Delta$T is the beacon propagation time from an access point to the MID. If $\Delta$T stays constant, it indicates that MID is stationary. If $\Delta$T decreases or increases it means the MID is moving in the direction or away from the AP from which the radio beacon is received. If $\Delta$T is increasing, it means the MID is going away from that access point that is sending the beacons and reverse is also true. The rate at which $\Delta$T increases or decreases can be therefore be the predictor of the MID's speed as well as the direction. Using the MID's estimated moving speed and the estimated coverage range of a network, the MID can estimate the time it will take to go through the network.

MPD can easily find out if the device is moving below 10 KMH or above by getting the knowledge from one of the followings.

4. Using Call Global Identity (CGI) from Cellular networks can be another way of measuring speed as described in Reference No. [6] cited above. Location parameters are broadcast on a Broadcast Control Channel in the cellular network and are used by the MS's cellular network interface for mobility management in the cellular network. The (U)SIM (which is specific to cellular network) in MS stores these parameters and updates them periodically as the MS traverses the cells of a cellular network. Mobility can be estimated how rapidly the MID is traversing the networks.

5. Having a Personal Area Network (e.g., Bluetooth) interfaced with the vehicles electronic odometer.

6. Getting and estimating how rapidly geographical coordinates, received from GPS device, are changing. It is also assumed that most of the MID in future may also have GPS integrated in them.

Description of PHY Layer Predictor

Although modeling the traffic correlation structure or predicting channel conditions is difficult in itself, we believe that traffic-assisted channel and channel-assisted traffic estimation can be used for prediction in wireless networks. Thus locally prepared database of "RF Transmission", "Typical Traffic Statistics", "Packet Size Distribution", and "User Behavior" can be used for future or near future predictions. Thus making a log of following parameters dully mapped with "Location" and "Time" can be used to prepare prediction about any interface.

1. Radio Frequency (RF) Transmission;
2. Traffic Time-Series;
3. Packet Size Distribution and Network Usage Pattern;
4. Typical Applications.

RF Transmission: Wireless networks' signal-to-noise-ration (SNR) and SS are affected by the RF transmission characteristics. These transmissions characteristics change with time, location, building layouts, obstacles, surrounding environments and antenna characteristics. Thus, empirical model can be prepared based on site- and time specific information. These models can be used later on for prediction of SNR at a WLAN/WAN receiver. Similar models have been widely used in the cellular industry for propagation predictions. See References [7-8] cited above.

Traffic Time-Series: Traffic Time Series Log, mapped with given location (office, home, cafeteria, etc.) can be prepared. Thus, throughput spikes and periods of high throughput demand can be recorded to find out the distribution of hourly network usage varied from day to day. This is important because total traffic load might not be necessarily proportional to the number of users (employees in an office or family members in a house) but on their usage behavior.

Packet Size Distribution and Network Usage Pattern: and: It describes ratio of outbound traffic volume to inbound traffic volume. This is important because most outbound packets are "request" packets, which are generally smaller than inbound "respond" packets. For example, Internet users generate smaller request packets and wait for larger response packets (e.g., web browsing, and news downloads). Such activities are generally seen more at public places (e.g., like home, cafeteria, hotspot, libraries etc), and during leisure hours (like early morning, lunch break, weekends etc). Thus, making a log of cumulative distribution function of packet sizes and traffic volume mapped with location and time will have positive impact on the prediction.

Typical Applications: Though TCP/UDP traffic load is typical but with the fast growth of real-time video/audio applications, especially voice over IP (VoIP), gaming, NNTP news reading and file sharing, the traffic load generated by several well-known applications will be large. However, usage of such applications will vary with many factors, such as user locations, surrounding environments and time of day. Thus, mapping this kind of information may help make effective prediction.

For reference, descriptions of ASP detection are set forth in Reference [1] and Reference [2] incorporated herein by reference above.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method of controlling a wireless mobile having multiple interfaces, comprising:
having said mobile be aware of its applications running on it;
having said mobile be aware of its operating situation;
said multiple interfaces including heterogeneous radio interfaces, and having said mobile control processes, including use of said heterogeneous radio interfaces, of said mobile during silent periods based on one or more of its application awareness and its operating situation awareness, said silent periods being brief intervals during which an application running on said mobile has no application traffic to send or receive;
further including having said mobile control use of said interfaces by using a second interface, during a silent period of a second application running on said mobile and using said second interface, to support a first application running on said mobile and using a first interface that is heterogeneous to said second interface such as to use both said first and second heterogeneous interfaces concurrently during said silent period to support said first application.

2. The method of claim 1, further including having said mobile control processes based on both of said application awareness and said operating situation awareness.

3. The method of claim 1, further including having said mobile control radio interface processes based on one or more of said application awareness and said operating situation awareness.

4. The method of claim 3, further including having said mobile control radio interface processes based on both of said application awareness and said operating situation awareness.

5. The method of claim 4, further including having said mobile make use of silent periods based on needs of applications running on said mobile.

6. The method of claim 4, further including having said mobile make use of silent periods based on the operating situation of said mobile.

7. The method of claim 1, further including having said mobile make use of silent periods based on needs of applications running on said mobile.

8. The method of claim 1, further including having said mobile control processes of said mobile during silent periods based on said mobile running a non-real-time application thereon or a real-time application thereon.

9. The method of claim 1, further including having said mobile control processes of said mobile during silent periods based on said mobile moving or not moving.

10. The method of claim 1, further including having said mobile switch to a certain process automatically based on an output from a mobility detector and/or PHY layer parameters.

11. The method of claim 1, further including having said mobile activate a secondary interface to offer enhanced bandwidth during said silent period if either an application needs additional bandwidth or data reception is not at a desired level.

12. The method of claim 11, further including having said mobile compare one or more parameters for both a primary interface and a secondary interface of said mobile and determining if the secondary interface qualifies to assist.

13. The method of claim 1, wherein said first and second heterogeneous interfaces are used concurrently during said silent period to support application traffic of said first application for enhanced bandwidth support by transmitting packetized application traffic for said first application concurrently over both said first and second heterogeneous interfaces.

14. The method of claim 1, wherein said second interface is used during said silent period to perform network discovery functions, which network discovery functions are used for handover of said mobile to a new network, transparent to and without interference to operation of said first application that concurrently uses said first interface during said network discovery.

15. A method of controlling a wireless mobile having multiple interfaces, comprising:
having said mobile be aware of its applications running on it;
having said mobile be aware of its operating situation, and having said mobile control processes of said mobile during silent periods based on one or more of its application awareness and its operating situation awareness;
further including having said mobile control processes of said mobile during silent periods based on said mobile running a non-real-time application thereon or a real-time application thereon;
further including having said mobile perform certain processes based on:
a) if it is running a real-time application and it is stationary;
b) if it is running a non-real-time application and it is moving;
c) if it is running a non-real-time application and it is stationary; and
d) if it is stationary and power consumption is not an issue.

16. The method of claim 15, further including having said mobile perform:
e) QoS enhancement if it is running a real-time application and it is stationary;
f) network discovery if it is running a non-real-time application and it is moving;
g) energy conservation if it is running a non-real-time application and it is stationary; and
h) information sharing if it is stationary and power consumption is not an issue.

17. The method of claim 15, further including having said mobile switch to a certain process automatically during said silent periods based on an output from a mobility detector and/or PHY layer parameters, and wherein said silent periods are brief intervals during which an application running on said mobile has no application traffic to send or receive.

18. A method of controlling a wireless mobile having multiple interfaces, comprising:
having said mobile be aware of its applications running on it;
having said mobile be aware of its operating situation;
said multiple interfaces including heterogeneous radio interfaces, and having said mobile control processes, including use of said heterogeneous radio interfaces, of said mobile during silent periods based on one or more of its application awareness and its operating situation awareness, said silent periods being brief intervals during which an application running on said mobile has no application traffic to send or receive
further including having said mobile activate a secondary interface to offer enhanced bandwidth during said silent period if either an application needs additional bandwidth or data reception is not at a desired level;
further including having said mobile compare one or more parameters for both a primary interface and a secondary interface of said mobile and determining if the secondary interface qualifies to assist
further including if the secondary interface qualifies to assist, a trigger is issued to the secondary interface, and the secondary interface sends a binding request to a Home Agent for a Secondary Care of Address, and the home agent uses tunneling mechanisms to forward Internet traffic, and if the secondary interface does not meet user expectations, a trigger is sent to the secondary interface, the secondary interface sends a binding request to the home agent for a care of address, the primary interface is shut down and the secondary interfaces is used for all user packets.

19. A mobile apparatus, comprising:
a plurality of heterogeneous network interfaces;
a processor;
said mobile being configured to monitor applications running on it, including real time or non real time nature of said applications;
said mobile being configured to monitor its operating situation, including moving or non moving status; and
said mobile being configured to control processes, including use of said heterogeneous network interfaces, of said mobile during silent periods based on one or more of its application awareness and its operating situation awareness, said silent periods being brief intervals during which an application running on said mobile has no application traffic to send or receive;
wherein said mobile is configured to switch between modes of operation of based on said application awareness and said situation awareness, including to switch between one or more of the following modes of operation QoS enhancement through multiple address mode, network discovery mode, energy saving mode, and chat with devices mode.

* * * * *

UNITED STATES PATENT AND TRADEMARK OFFICE
CERTIFICATE OF CORRECTION

PATENT NO.       : 8,073,436 B2
APPLICATION NO.  : 11/558273
DATED            : December 6, 2011
INVENTOR(S)      : Yaqub et al.

It is certified that error appears in the above-identified patent and that said Letters Patent is hereby corrected as shown below:

In the Specification

In Column 1, Line 49, delete "as" and insert -- as a --, therefor.

In Column 1, Line 67, delete "Name, A" and insert -- Name, a --, therefor.

In Column 2, Lines 31-32, delete "draft-ietf-monami6-multiplecoa-01.txt." and insert -- draft-ietf-monami6-multiplecoa-01.txt, --, therefor.

In Column 3, Line 63, delete "perform;" and insert -- perform: --, therefor.

In Column 4, Line 59, delete "description" and insert -- descriptions --, therefor.

In Column 7, Line 16, delete "and or" and insert -- and/or --, therefor.

In Column 8, Line 4, delete "known" and insert -- know --, therefor.

In Column 8, Line 17, delete "interface" and insert -- Interface --, therefor.

In Column 8, Line 22, delete "paths/addresses." and insert -- paths/addresses, --, therefor.

In Column 9, Line 2, delete "((if" and insert -- (if --, therefor.

In Column 9, Line 31, delete "and or" and insert -- and/or --, therefor.

In Column 11, Line 40, delete "form" and insert -- from --, therefor.

In Column 13, Line 26, delete "(e.g.," and insert -- e.g., --, therefor.

Signed and Sealed this
Tenth Day of February, 2015

Michelle K. Lee
*Deputy Director of the United States Patent and Trademark Office*

CERTIFICATE OF CORRECTION (continued)
U.S. Pat. No. 8,073,436 B2

In Column 14, Line 3, delete "MPD" and insert -- MDP --, therefor.

In Column 14, Line 29, delete "Call" and insert -- Cell --, therefor.

In Column 15, Line 12, delete "Pattern: and:" and insert -- Pattern: --, therefor.

In Column 15, Line 31, delete "of" and insert -- of the --, therefor.

In the Claims

In Column 18, Line 13, in Claim 18, delete "receive" and insert -- receive; --, therefor.

In Column 18, Line 21, in Claim 18, delete "assist" and insert -- assist; --, therefor.